United States Patent Office 3,215,721
Patented Nov. 2, 1965

3,215,721
5-ALKYL O-AMINOALKYL ESTERS OF ALKYL, ARYL, AND CYCLOHEXYL DITHIOPHOSPHONIC ACIDS
Reimer Cölln, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Dec. 20, 1960, Ser. No. 77,031
Claims priority, application Germany, Dec. 23, 1959, F 30,159
17 Claims. (Cl. 260—461)

The present invention relates to and has as its objects new and useful insecticidal phosphonic acid esters and methods for their preparation. The new compounds of this invention may be represented by the following general formula $$R-\overset{S}{\underset{SR_3}{\overset{\|}{P}}}\diagup\overset{O-Alk-N\diagup R_1}{\diagdown R_2}$$

in which R stands for aliphatic or aromatic radicals,

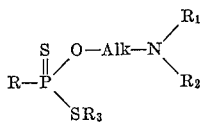

stands for the radical of a primary or secondary amine and $R_3$ stands for an alkyl radical. The radical —Alk— stands for an alkylene chain.

In accordance with the present invention it has now been found that dithiophosphonic acid anhydrides react with primary or secondary amino-alkanols, whereby the corresponding O-alkyl-dithiophosphonic acids are obtained. The latter are obtained in the form of betain-type salts which are insoluble in organic solvents and therefore easily can be separated in the solid form. These salts thus may be isolated by filtration. The following equation may illustrate the reaction:

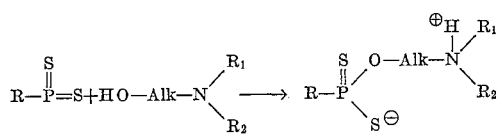

In these formulae the symbols have the above shown significance.

The aforementioned dithiophosphonic acid-O-alkyl esters may be further reacted with optional alkyl halides in the presence of acid-binding agents to form the hitherto unknown dithiophosphonic acid-O-aminoalkyl-S-alkyl esters. This reaction may be illustrated by the following equation:

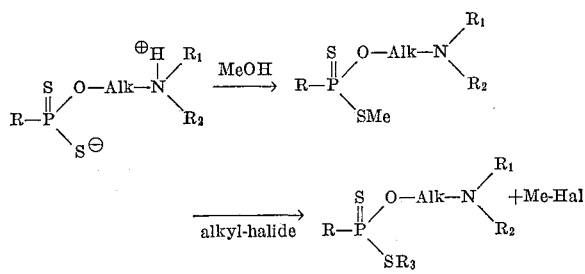

In these formulae the symbols again have the same significance as given above.

The new compounds of the present invention very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the present invention the compound of the following formula

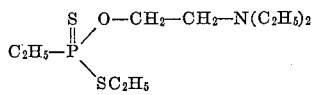

has been tested against spider mites.

Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test has been carried out as follows:

Bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evalution has been carried out after 24 hours, 48 hours and 18 days. The following results have been obtained:

Spider mites were killed completely with 0.001% solutions.

The following examples are given for the purpose of illustrating the process.

*Example 1.—O-dimethylamino-ethyl-methyl-dithiophosphonic acid*

33.0 grams of methyl-dithiophosphonic acid anhydride (0.3 mol) are suspended in 300 cc. of benzene and treated with 27.5 grams of dimethylamino ethanol in one jet while stirring. The temperature thereby rises to 52° C. The reaction mixture is stirred at 50° C. for a further 30 minutes and filtered after cooling. The filter residue is stirred with 250 cc. of ethanol at 50° C., again filtered off with suction, washed with ethanol and dried at 70° C. in a vacuum. Yield: 37.0 grams of colorless crystals of melting point 181.5° C. (62% of the theoretical) of the following compound:

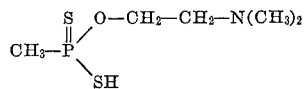

Calculated: P, 15.55; S, 32.18; N, 7.03. Found: P, 14.77; S, 31.52; N, 6.98.

*Example 2.—O-dimethylaminoethyl-ethyldithiophosphonic acid*

To a suspension of 37.3 grams of ethyl-dithiophosphonic acid anhydride (0.3 mol) in 300 cc. of benzene are added dropwise with stirring 27.0 grams of dimethylamino ethanol at 50° C. The reaction product separates out as a colorless slurry. The benzene is decanted off and the residue stirred with 400 cc. of ethanol at 50° C. After cooling, the crystals are filtered off with suction, washed wtih ethanol and dried at 50° C. in a vacuum. Yield:

54.0 grams of colorless crystals of melting point 146° C. (84% of the theoretical) of the following compound

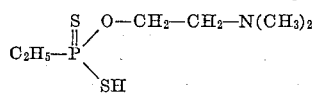

Calculated: P, 14.52; S, 30.06; N, 6.57. Found: P, 13.86; S, 30.04; N, 6.47.

*Example 3.—O-dimethylaminoethyl-cyclohexyl-dithiophosphonic acid*

To a suspension of 53.5 grams of cyclohexyl-dithiophosphonic acid anhydride (0.3 mol) in 300 cc. of benzene are added 27.0 grams of dimethylamino ethanol in one jet with stirring at room temperature. The temperature immediately rises to 65° C. After the solution has temporarily become clear, the reaction product crystallizes out upon cooling. The crystals are filtered off with suction, washed with benzene and dried at 50° C. in a vacuum.

There are obtained 76.0 grams of colorless crystals of melting point 187.5° C. (94% of the theoretical) of the following compound:

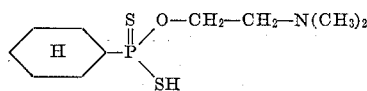

Calculated: P, 11.59; S, 23.98; N, 5.24. Found: P, 11.13; S, 23.21; N, 5.21.

*Example 4.—O-dimethylaminoethyl-anisyl-dithiophosphonic acid*

To a suspension of 60.7 grams of anisyl-dithiophosphonic acid anhydride (0.3 mol) in 400 cc. of benzene are added 27.0 grams of dimethylamino ethanol in one jet while stirring at room temperature. The internal temperature slowly rises to 48° C. The mixture is stirred at 55° C. for a further 45 minutes. After cooling, the reaction product is filtered off with suction, washed and dried at 70° C. under vacuum. There are obtained 79.0 grams of colorless crystals of melting point 195° C. (90% of the theoretical) of the following compound:

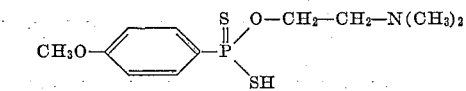

Calculated: P, 10.63; S, 22.01; N, 4.81. Found: P, 9.73; S, 21.89; N, 4.76.

*Example 5.—O-methylaminoethyl-ethyl-dithiophosphonic acid*

To a suspension of 37.3 grams of ethyl-dithiophosphonic acid anhydride (0.3 mol) in 300 cc. of benzene are added 23.0 grams of N-methylamino ethanol in one jet while stirring at room temperature. The mixture is stirred at 55° C. for 30 minutes. The reaction product partially separates out as a colorless slurry. The benzene is distilled off and the material allowed to stand over night; part of the reaction product crystallizes out. The slurry is stirred in the hot (55° C.) with 250 cc. of ethanol and thus brought to crystallization. Both crystallization products are filtered off with suction, washed and dried at 70° C. under vacuum.

40 grams of colorless crystals of melting point 147.5° C. (67% of the theoretical) of the following compound are obtained:

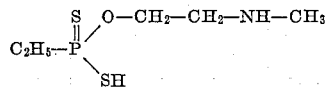

Calculated: P, 15.55; S, 32.18; N, 7.03. Found: P, 15.11; S, 32.18; N, 6.81.

*Example 6.—O-diethylaminoethyl-methyl-dithiophosphonic acid*

From 33.0 grams of methyl-dithiophosphonic acid anhydride (0.3 mol) and 36.0 grams of diethylamino ethanol there are obtained in the same manner as described in Example 1, 28.0 grams of colorless crystals of melting point 182.5° C. (41% of the theoretical). The compound corresponds to the following formula:

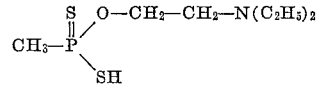

Calculated: P, 13.63; S, 28.21; N, 6.16. Found: P, 12.43; S, 27.46; N, 5.79.

*Example 7.—O-diethylaminoethyl-ethyl-dithiophosphonic acid*

To a suspension of 74.6 grams of ethyl-dithiophosphonic acid anhydride (0.6 mol) in 600 cc. of benzene are added 72 grams of diethylaminoethanol in one jet at room temperature while stirring, the temperature rising spontaneously to 62° C. The mixture is stirred at 55° C. for 30 minutes and filtered after cooling. The filter residue is washed with benzene and dried at 70° C. in a vacuum. Yield: 142.0 grams of colorless crystals of melting point 142.5° C. (98% of the theoretical). The compound corresponds to the following formula:

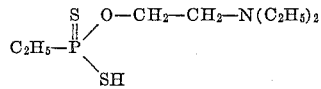

Calculated: P, 12.85; S, 26.57; N, 5.80. Found: P, 12.29; S, 26.64; N, 5.82.

*Example 8.—O-diethylaminoethyl-cyclohexyl-dithiophosphonic acid*

In the same manner as described in Example 7 there are obtained from 53.5 grams of cyclohexyl-dithiophosphonic acid anhydride and 36.0 grams of diethylamino ethanol (in 300 cc. of benzene), 80.5 grams of colorless crystals of melting point 162.5° C. (91% of the theoretical). The compound corresponds to the following formula:

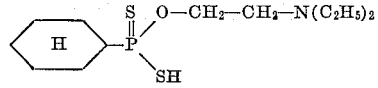

Calculated: P, 10.49; S, 21.70; N, 4.74. Found: P, 10.31; S, 21.70; N, 4.72.

*Example 9.—O-diethylaminoethyl-anisyl-dithiophosphonic acid*

In the same manner as described in Example 7 there are obtained from 60.7 grams of anisyl-dithiophosphonic acid anhydride (0.3 mol) and 36.0 grams of diethylamino ethanol (in 400 cc. of benzene) 84.0 grams of colorless crystals of melting point 176° C. (87% of the theoretical). The compound corresponds to the following formula:

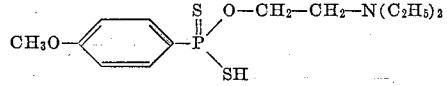

Calculated: P, 9.70; S, 20.07; N, 4.39. Found: P, 9.27; S, 19.53; N, 4.07.

*Example 10.—O-diethylaminoisopropyl-ethyl-dithiophosphonic acid*

To a suspension of 37.3 grams of ethyl-dithiophosphonic acid anhydride in 300 cc. of benzene are added 40.0 grams of diethylaminoisopropanol in one jet at room temperature while stirring. The internal temperature rises spontaneously to 56° C. The mixture is stirred at 55° C. for 30 minutes. Upon cooling, the reaction product crystallizes out. It is filtered off with suction, washed and dried at 60° C. in a vacuum. Yield: 68.1 grams of colorless crystals of melting point 138° C. The compound corresponds to the following formula:

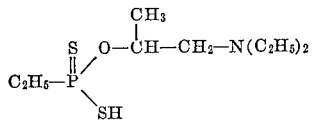

Calculated: P, 12.13; S, 25.11; N, 5.49. Found: P, 12.00; S, 25.30; N. 5.41.

*Example 11.—O-diethylaminoisopropyl-cyclohexyl-dithiophosphonic acid*

In the same manner as described in Example 10 there are obtained from 53.2 grams of cyclohexyl-dithiophosphonic acid anhydride and 40.0 grams of diethylamino-isopropanol (in 300 cc. of benzene) 73.5 grams of colorless crystals of melting point 154.5° C. (79% of the theoretical). The compound corresponds to the following formula:

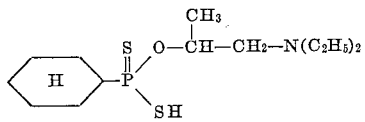

Calculated: P, 10.01; S, 20.72; N, 4.53. Found: P, 9.66; S, 21.04; N, 4.39.

*Example 12.—O-diethylaminoisopropyl-anisyl-dithiophosphonic acid*

In the same manner as described in Example 10 there are obtained from 40.5 grams of anisyl-dithiophosphonic acid anhydride (0.2 mol) and 28.0 grams of diethyl-amino-isopropanol (in 300 cc. of benzene) 54.5 grams of colorless crystals of melting point 172° C. (67% of the theoretical). The compound corresponds to the following formula:

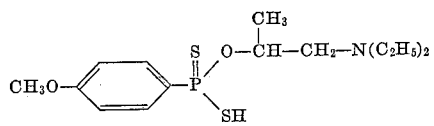

Calculated: P, 9.29; S, 19.23; N, 4.20. Found: P, 8.95; S, 19.18; N, 4.39.

*Example 13.—O-dimethylaminoethyl-ethyl-dithiophosphonic acid-S-ethyl ester*

To 42.7 grams of O-dimethylaminoethyl-ethyl-dithiophosphonic acid in 100 cc. of ethanol is added a solution of 11.2 grams of potassium hydroxide in 100 cc. of ethanol and subsequently 31.2 grams of ethyl iodide. The mixture is stirred at 70° C. for 1 hour and, after cooling, filtered off from the resulting salt. The filtrate is stirred with 150 cc. of water and 150 cc. of chloroform. The organic phase is separated off, washed twice with water, dried and freed from the solvent in a vacuum. The residue, after distillation in a high vacuum, yields 23.3 grams of a colorless liquid of B.P. 76° C./0.01 mm. Hg (48% of the theoretical). The compound corresponds to the following formula:

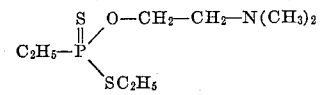

Calculated: P, 12.84; S, 26.57; N, 5.80. Found: P, 12.45; S, 26.65; N, 5.86.

LD$_{50}$ on rats per os 10 mg./kg. Aphids are killed to 60% with 0.01% solutions.

By the same way there may be obtained the compounds of the following formulae:

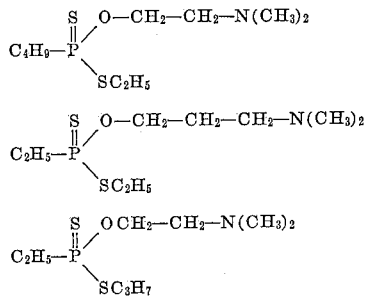

*Example 14.—O-diethylaminoethyl-methyl-dithiophosphonic acid-S-ethyl ester*

45.5 grams of O-diethylaminoethyl-methyl-dithiophosphonic acid (0.2 mol) are suspended in 100 cc. of ethanol and dissolved by the dropwise addition of 46.0 grams of sodium methylate solution (0.2 mol Na). After the addition of 31.2 grams of ethyl iodide the mixture is stirred at 70 C. for one hour and filtered off after cooling. After working up in conventional manner (see Example 13), there may be obtained 25.0 grams of a colorless liquid of B.P. 77° C./0.01 mm. Hg (49% of the theoretical). The compound corresponds to the following formula:

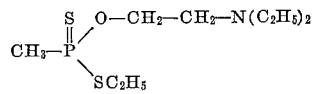

Calculated: P, 12.13; S, 25.11; N, 5.49. Found: P, 11.90; S, 24.42; N, 5.29.

LD$_{50}$ on rats per os 1 mg./kg. Aphids were killed to 90% with 0.001% solutions. Systemic action with 0.1% solutions 100%.

By the same way there may be obtained the compounds of the following formulae:

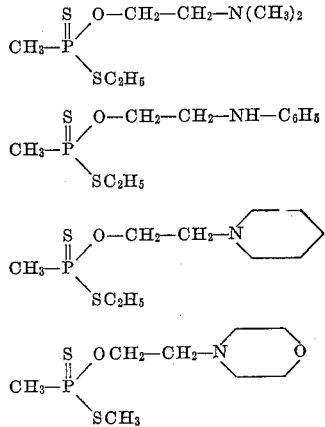

*Example 15.—O-diethylaminoethyl-ethyl-dithiophosphonic acid-S-ethyl ester*

To a suspension of 48.2 grams of O-diethylaminoethyl-ethyl-dithiophosphonic acid (0.2 mol) in 200 cc. of ethanol are added dropwise at room temperature while stirring 62.6 grams of sodium ethylate solution (0.2 mol). After the addition of 33.0 grams of ethyl iodide the mixture is stirred at 70°–75° C. for an hour. After working up as usual 27.2 grams of an almost colorless oil of B.P. 92° C./0.01 mm. Hg are obtained (53% of the theoretical).

The compound corresponds to the following formula:

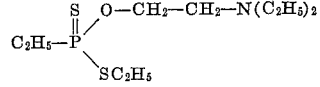

Calculated: P, 11.50; S, 23.80; N, 5.20. Found: P, 11.20; S, 25.40; N, 4.82.

LD$_{50}$ on rats per os 1 mg./kg. Spider mites are killed completely with 0.001% solutions and caterpillars are killed completely with 0.1% solutions.

By the same way there may be obtained the compound of the following formula:

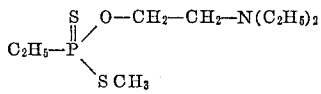

*Example 16.—O-diethylaminoethyl-cyclohexyl-dithiophosphonic acid-S-ethyl ester*

59.1 grams of O-diethylaminoethyl-cyclohexyl-dithiophosphonic acid are suspended in 150 cc. of ethanol and dissolved by the dropwise addition of 46.0 grams of sodium methylate solution (0.2 mol). After the addition of 31.2 grams of ethyl iodide, the mixture is stirred at 70° C. for one hour and worked up as usual; 54.0 grams of a pale yellowish oil (83% of the theoretical) are thus obtained. This compound corresponds to the formula:

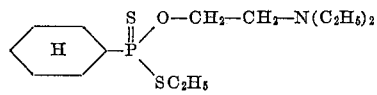

Calculated: P, 9.58; S, 19.82; N, 4.33. Found: P, 9.52; S, 19.87; N, 4.35.

LD$_{50}$ on rats per os 250 mg./kg. Aphids are killed completely with 0.1% solutions.

By the same way there may be obtained the compounds of the following formulae:

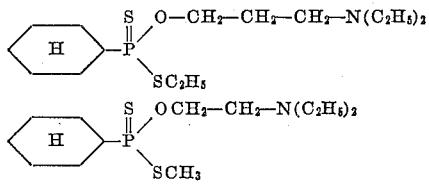

*Example 17.—O-diethylaminoethyl-anisyl-dithiophosphonic acid-S-ethyl ester*

63.9 grams of O-diethylaminoethyl-anisyl-dithiophosphonic acid (0.2 mol) are suspended in 200 cc. of ethanol and dissolved by the dropwise addition of 46.0 grams of sodium methylate solution (0.2 mol). After the addition of 31.2 grams of ethyl iodide, the mixture is stirred at 70° C. for one hour and, after cooling, worked up as usual. 54.5 grams of a pale yellowish oil are thus obtained (78% of the theoretical). The compound corresponds to the following formula:

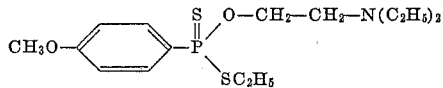

Calculated: P, 8.92; S, 18.45; N, 4.03. Found: P, 8.93; S, 17.70; N, 3.62.

LD$_{50}$ on rats per os 10 mg./kg. Aphids are killed to 80% with 0.01% solutions.

By the same way there may be obtained the compounds of the following formulae:

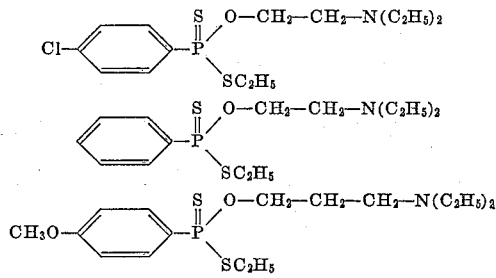

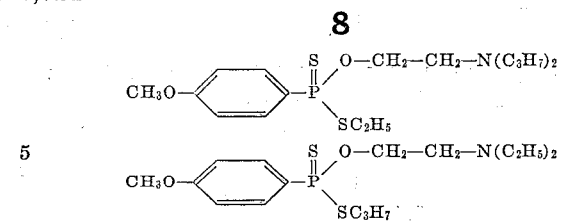

*Example 18.—O-diethyl-aminoisopropyl-ethyldithiophosphonic acid-S-ethyl ester*

To 51.1 grams of diethylaminoisopropyl-ethyl-dithiophosphonic acid in 150 cc. of ethanol are added dropwise 46.0 grams of sodium methylate solution (0.2 mol Na) at room temperature while stirring. The solution is treated with 31.2 grams of ethyliodide and stirred at 70° C. for one hour. After cooling, the mixture is stirred with 250 cc. of water and 200 cc. of chloroform. The organic phase is separated off, washed twice with plenty of water, dried and freed from the solvent in a vacuum. The residue, after distillation in a high vacuum, yields 44.5 grams of a colorless oil of B.P. 80° C./0.01 mm. Hg (78% of the theoretical). The compound corresponds to the formula:

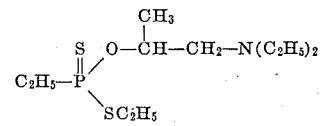

Calculated: P, 10.93; S, 22.62; N, 4.94. Found: P, 10.11; S, 21.60; N, 5.17.

LD$_{50}$ on rats per os 1 mg./kg. Aphids are killed to 95% with 0.001% solutions. Systematic action with 0.1% solutions 100%.

*Example 19.—O-diethylaminoisopropyl-cyclohexyl-dithiophosphonic acid-S-ethyl ester*

61.9 grams of O-diethylaminoisopropyl-cyclohexyl-dithiophosphonic acid (0.2 mol) in 150 cc. of ethanol are dissolved by the addition of 46.0 grams of sodium methylate solution (0.2 mol Na). After the addition of 31.2 grams of ethyl iodide, the mixture is stirred at 70° C. for one hour and after cooling freed from the solvent in a vacuum. The residue is taken up with 200 cc. of chloroform, washed twice with 80 cc.-portions of water, dried and freed from the solvent in a vacuum.

58.5 grams of a colorless oil (86% of the theoretical) are thus obtained. This compound corresponds to the formula:

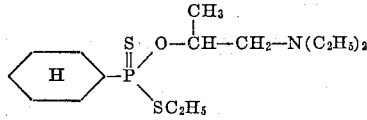

Calculated: P, 9.18; S, 19.00; N, 4.15. Found: P, 8.79; S, 18.95; N, 4.24.

LD$_{50}$ on rats per os 1000 mg./kg. Aphids are killed to 80% with 0.01% solutions.

*Example 20.—O-diethylaminoisopropyl-p-anisyl dithiophosphonic acid-S-ethyl ester*

In a similar manner there are obtained from 43.3 grams of O-diethyl-aminoisopropyl-p-anisyl-dithiophosphonic acid (0.13 mol) and 20.5 grams of ethyl iodide (in 150 cc. of ethanol) 41.8 grams of an almost colorless oil (89% of the theoretical).

The compound corresponds to the following formula:

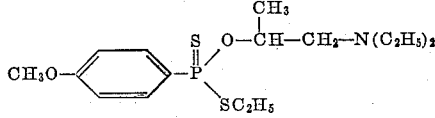

Calculated: P, 8.57; S, 17.74; N, 3.88. Found: P, 8.44; S, 16.70; N, 4.00.

LD$_{50}$ on rats per os 10 mg./kg. Aphids are killed to 40% with 0.01% solutions. Caterpillars are killed completely with 0.1% solutions.

We claim:

1. A compound of the following general formula:

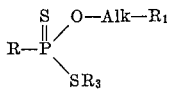

wherein R stands for a member selected from the group consisting of lower alkyl up to 6 carbon atoms, phenyl, chloro-substituted phenyl, lower alkoxy-substituted phenyl and cyclohexyl; R$_1$ stands for a member selected from the group consisting of monolower alkylamino, dilower alkylamino, anilino, piperidino, morpholino; Alk stands for alkylene having two to three carbon atoms and R$_3$ stands for lower alkyl up to 4 carbon atoms.

2. A compound of claim 1 wherein R stands for lower alkyl having up to 6 carbon atoms, Alk stands for alkylene having 2 to 3 carbon atoms and R$_1$ stands for monolower alkylamino.

3. A compound of claim 1 wherein R stands for lower alkyl having up to 6 carbon atoms, Alk stands for alkylene having 2 to 3 carbon atoms and R$_1$ stands for dilower alkylamino.

4. A compound of claim 1 wherein R stands for chlorophenyl, Alk stands for alkylene having 2 to 3 carbon atoms and R$_1$ stands for monolower alkylamino.

5. A compound of claim 1 wherein R stands for chlorophenyl, Alk stands for alkylene having 2 to 3 carbon atoms and R$_1$ stands for dilower alkylamino.

6. A compound of claim 1 wherein R stands for lower alkoxy phenyl, Alk stands for alkylene having 2 to 3 carbon atoms and R$_1$ stands for monolower alkylamino.

7. A compound of claim 1 wherein R stands for lower alkoxy phenyl, Alk stands for alkylene having 2 to 3 carbon atoms and R$_1$ stands for dilower alkylamino.

8. A compound of claim 1 wherein R stands for cyclohexyl, Alk stands for alkylene having 2 to 3 carbon atoms and R$_1$ stands for monolower alkylamino.

9. A compound of claim 1 wherein R stands for cyclohexyl, Alk stands for alkylene having 2 to 3 carbon atoms and R$_1$ stands for dilower alkylamino.

10. The compound of the following formula:

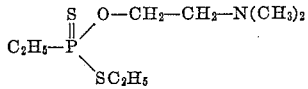

11. The compound of the following formula:

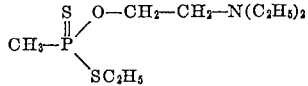

12. The compound of the following formula:

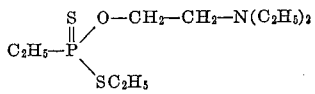

13. The compound of the following formula:

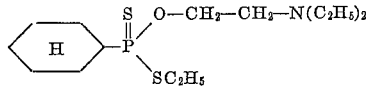

14. The compound of the following formula:

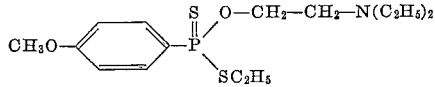

15. The compound of the following formula:

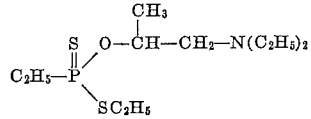

16. The compound of the following formula:

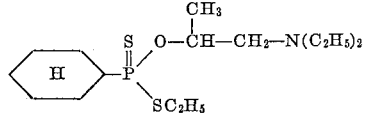

17. The compound of the following formula:

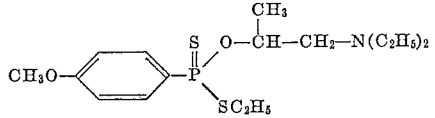

References Cited by the Examiner

UNITED STATES PATENTS

| | | | |
|---|---|---|---|
| 2,831,014 | 4/58 | Sallmann et al. | 260—461 |
| 2,881,201 | 4/59 | Schrader | 260—461 |
| 2,908,605 | 10/59 | Beriger et al. | 260—461 |
| 2,917,533 | 12/59 | Burger | 260—461 |
| 2,918,488 | 12/59 | Schrader | 260—461 |
| 2,959,516 | 11/60 | Sallmann | 260—461 |
| 2,965,665 | 12/60 | Gaertner et al. | 260—461 |
| 2,967,884 | 1/61 | Dunn et al. | 260—461 |
| 3,014,943 | 12/61 | Schegk et al. | 260—461 |

FOREIGN PATENTS

| | | |
|---|---|---|
| 1,058,992 | 6/59 | Germany. |
| 1,064,510 | 9/59 | Germany. |
| 1,072,245 | 12/59 | Germany. |
| 797,603 | 7/58 | Great Britain. |
| 847,550 | 9/60 | Great Britain. |

CHARLES B. PARKER, *Primary Examiner.*

ABRAHAM H. WINKELSTEIN, MORRIS LIEBMAN,
*Examiners.*